United States Patent [19]

Harima et al.

[11] Patent Number: 5,014,836

[45] Date of Patent: May 14, 1991

[54] FAN DRIVE CLUTCH FOR INTERNAL COMBUSTION ENGINE

[75] Inventors: Toshio Harima; Kenichi Sato; Tatsuyuki Matsuya, all of Kanagawa, Japan

[73] Assignee: Atsugi Motor Parts Company, Limited, Kanagawa, Japan

[21] Appl. No.: 361,286

[22] Filed: Jun. 5, 1989

[30] Foreign Application Priority Data

Jun. 7, 1988 [JP] Japan .............................. 63-75688[U]

[51] Int. Cl.[5] ............................................. F16D 35/00
[52] U.S. Cl. ................................. 192/58 B; 192/82 T
[58] Field of Search .................... 192/304, 59 B, 82 T

[56] References Cited

U.S. PATENT DOCUMENTS

| 3,135,370 | 6/1964 | Sutton | 192/58 B |
| 3,856,122 | 12/1974 | Leichliter | 192/58 B |
| 4,265,348 | 5/1981 | Clarke | 192/82 T |
| 4,346,797 | 8/1982 | Bopp | 192/82 T |
| 4,421,216 | 12/1983 | Ellis | 192/58 B |
| 4,846,331 | 7/1989 | Ono | 192/58 B |

FOREIGN PATENT DOCUMENTS

| 045037 | 3/1982 | European Pat. Off. . | |
| 130024 | 2/1985 | European Pat. Off. . | |
| 130724 | 9/1985 | European Pat. Off. . | |
| 55-69327 | 5/1980 | Japan | 192/58 B |
| 58-102831 | 6/1983 | Japan | 192/58 B |

Primary Examiner—Allan D. Herrmann
Assistant Examiner—Andrea Pitts
Attorney, Agent, or Firm—Ronald P. Kananen

[57] ABSTRACT

A fan drive clutch is provided which includes a fluid coupling for coupling a drive shaft and a clutch housing on which a fan for blowing air to a radiator is disposed. This clutch has a pump plate for defining a fluid reservoir chamber and a working chamber. The pump plate includes a valve opening through which working fluid passes from the reservoir chamber into the working chamber. The fan drive clutch further includes a valve arm which has a valve plate for opening and closing the valve opening. The valve arm includes an elastically transformable section at a connecting portion between it and the valve plate. This section is operable to absorb movement of the valve arm which may be caused due to a clearance between the shaft for supporting the valve arm and the bearing hole for rotatably supporting the shaft. Therefore, an entire surface of the valve plate is maintained in contact with the facing surface of the pump plate to hermetically close the valve opening without occurrence of any gap therebetween regardless of the movement of the valve arm.

4 Claims, 3 Drawing Sheets

FAN DRIVE CLUTCH FOR INTERNAL COMBUSTION ENGINE

BACKGROUND OF THE INVENTION

1. Technical Field

The present invention relates generally to a fan drive clutch for an internal combustion engine. More specifically, the invention relates to a temperature sensitive type 'an drive clutch including a fluid coupling for controlling the rotational speed of a fan.

2. Background Art

Use of temperature sensitive type fan drive clutches in automotive cooling systems is well known in the art. This type of fan drive clutch generally includes a fluid coupling which couples a drive shaft with a clutch housing on which a fan is disposed. The fan is operated according to the air temperature required by an automotive radiator. The fluid coupling allows the fan to rotate, blowing air into the radiator. The fan drive clutch is adapted for controlling the rotational speed of the fan so as to increase the fan speed when engine cooling requirements are severe and to drop the fan speed when the engine cooling requirements are low.

Internally, the fluid coupling is provided with a pump plate for defining a fluid reservoir chamber and a working chamber, a clutch plate, a valve arm, and a bimetallic coil for controlling the movement of the valve arm. The clutch plate has labyrinth grooves in its outer end section for engaging with corresponding labyrinth grooves formed in the inner wall of the housing. The pump plate has a through hole for allowing working fluid to pass therethrough from the reservoir chamber to the working chamber. The valve arm includes a valve plate for opening and closing the through hole to control the flow rate of the working fluid from the reservoir chamber into the working chamber. The valve arm is rotatably attached to the clutch housing by means of a shaft which is inserted into a bearing hole provided in the clutch housing. The bimetallic coil is connected to the valve arm and is operable to move the valve arm so as to slide it through the bearing hole according to variations in the temperature of the air passing through the radiator. This action causes a through hole to be opened and closed, the working fluid thereby flowing into the working chamber. When more working fluid is supplied into the labyrinths to couple the drive shaft with the clutch housing, more torque from the drive shaft is transmitted to the clutch housing, and therefore fan speed is increased.

Conventional fan drive clutches usually require location of the valve plate as close to the pump plate as possible in order to close and open the through hole hermetically. However, in a conventional clutch, a certain clearance is provided between the shaft for supporting the valve arm and the bearing hole formed in the clutch housing on account of the assembly tolerance required. Thus, when the shaft moves within the clearance, the valve arm tends to swing according to the motion of the shaft. For example, the top edge of the valve plate can be forced against a surface of the pump plate, while the opposite edge thereof is lifted from the surface of the pump plate causing a relatively large gap to occur. As a result, the working fluid in the reservoir chamber flows into the working chamber through the gap and the through hole. The working pressure within the working chamber is therefore increased. As a result, even when engine cooling requirements are low, some torque from the drive shaft tends to be transmitted to the housing, causing the fan to rotate. Thus, the radiator can be overcooled during engine warm-up.

SUMMARY OF THE INVENTION

It is accordingly an object of the present invention to provide a fan drive clutch wherein even if a fluid valve plate swings, no clearance occurs between the fluid valve plate and the clutch plate. In this way, hermetic sealing of the opening which communicates between the fluid reservoir chamber and the working chamber can be maintained.

According to one aspect of the invention, there is provided an apparatus for coupling a first member with a second member connected to a drive source which comprises a plate for defining a fluid reservoir chamber and a working chamber, the plate having an opening for communicating therebetween so as to allow working fluid to flow from the fluid reservoir chamber into the working chamber, a valve, supported by the first member via supporting means, for slidably contacting with a surface of the plate so as to open and close the opening, fluid coupling means, provided within the working chamber, for coupling the first member with the second member to transmit torque from the drive source of the second member to the first member in accordance with variations in the amount of working fluid within the working chamber due to the opening and closing of said valve, and absorbing means for absorbing vibrations transmitted from the supporting means to the valve so as to maintain it in contact with a surface of the plate without any clearance therebetween.

In a preferred mode, the valve may include a valve plate and a valve arm rotatably supported by the first member. The absorbing means is an elastic member connecting the valve plate to the valve arm so as to be elastically deformed by vibration of the valve arm to maintain the valve plate in contact with the surface of the plate without any clearance therebetween. The valve plate may further include an extending portion which extends from an edge of the valve plate in the opposite direction to the portion corresponding to the opening with respect to the position at which the valve plate is connected to the valve arm. Alternatively, the valve plate may include a pair of extending portions. Each is integrally connected to an edge of the valve plate so as to extend in the opposite direction from a portion corresponding to the opening with respect to the position at which the valve plate is connected to the valve arm. Further, the elastic member may be in the form of a strip plate having a width narrower than that of the valve arm.

According to another aspect of the invention, there is provided a fan drive clutch for an internal combustion engine which comprises a clutch housing on which a fan is disposed, a pump plate for defining a fluid reservoir chamber and a working chamber within the clutch housing, the pump plate having an opening for communicating between the fluid reservoir chamber and the working chamber, a valve rotatably supported by a shaft which is inserted into a bearing hole of the clutch housing, the valve coming in contact with a surface of the pump plate to open and close the opening, fluid coupling means, provided within the working chamber, for coupling between a drive shaft and the clutch housing to rotate the fan in accordance with variations in the amount of working fluid within the working chamber due to the opening and closing of the valve, and absorbing means for absorbing movement of the valve due to movement of the shaft within a clearance between the shaft and the bearing hole so as to maintain the valve in contact with the surface of the pump plate without any clearance therebetween.

BRIEF DESCRIPTION OF THE DRAWINGS

The present invention will be understood from the detailed description given hereinbelow and from the accompanying drawings of the preferred embodiment of the invention which are not intended to limit the invention to a specific embodiment but are for explanation and understanding only.

DESCRIPTION OF THE PREFERRED EMBODIMENT

Figure 1:
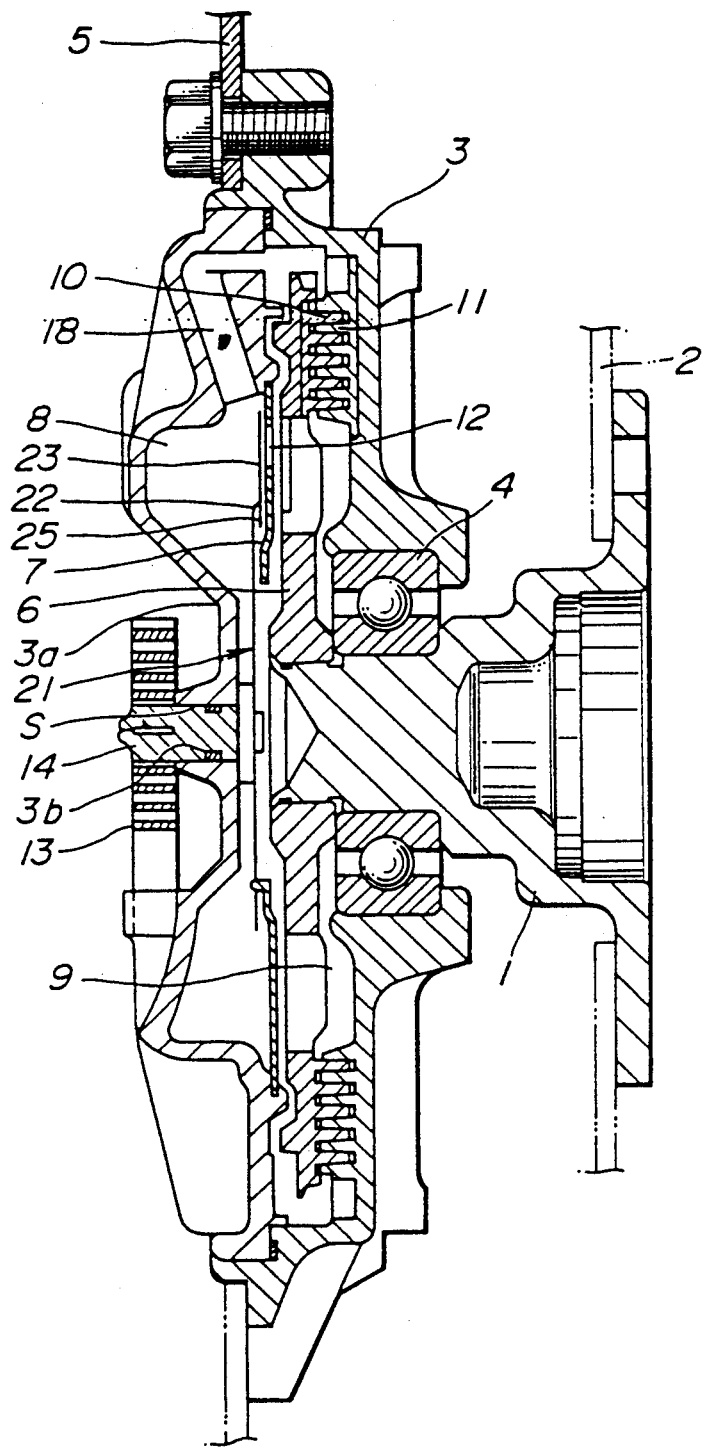
FIG. 1 a cross sectional view which shows a fan drive clutch according to the invention.
Figure 4:
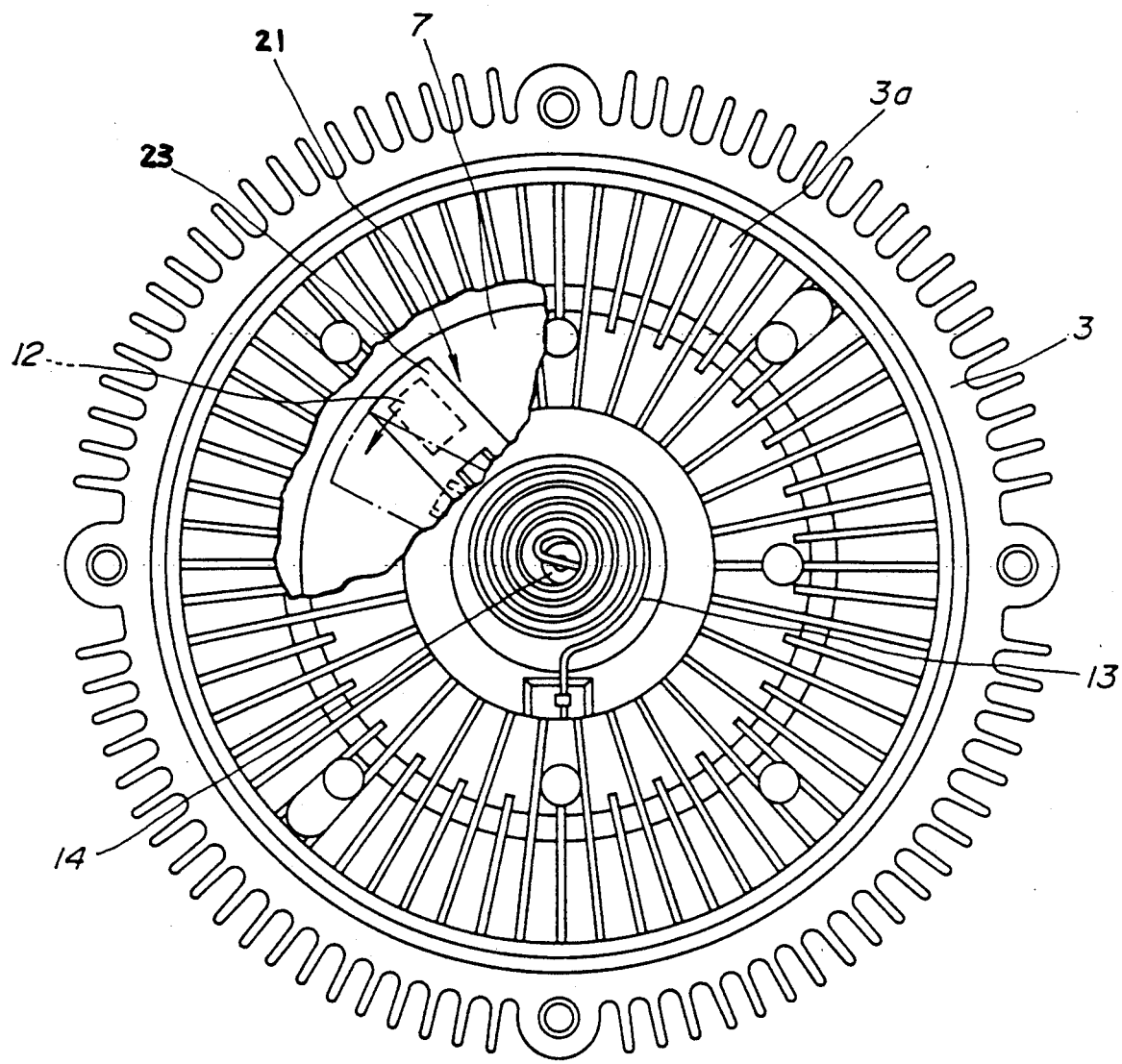
FIG. 4 is a partially cut-out front view which shows a fan drive clutch according to the invention.

Referring now to the drawing, particularly to FIG. 1, a fan drive clutch according to the present invention is shown which includes a fluid coupling filled with a special silicone oil or so forth. This fan drive clutch generally includes a clutch housing 3, a pump plate 7, a shaft 14, and a valve arm 21. On the circumference of the housing 3, a fan for blowing air to cool a radiator (not shown) is installed. A drive shaft 1 is rotatably supported by the clutch housing 3 via ball bearings 4. A V-belt pulley 2 is mounted on an end of the drive shaft, while a clutch plate 6 is installed firmly on the other end thereof within the housing 3. The clutch plate 6 has labyrinth grooves 10 at its outer end section. On the inner wall of the clutch housing 3 at a portion, corresponding to the labyrinth grooves 10, labyrinth grooves 11 are formed for engaging with labyrinth grooves 10. These labyrinths 10 and 11 function as a fluid coupling by the viscous resistance of the working fluid. The pump plate 7 is disposed in the inner wall of the clutch housing 3 to define a working chamber 9 and a fluid reservoir chamber 8. The pump plate 7 has an opening 12 elongated in the radial direction for allowing the fluid to pass therethrough from the reservoir chamber 8 into the working chamber 9. In the center of the clutch housing 3, a hole 3b is provided as a bearing. A shaft 14, on an end of which the valve arm 21 is installed, is inserted into the bearing hole 3b. A bimetallic coil 13 is mounted on the other end section of the shaft 14. The bimetallic coil 13 is operable to rotate the valve arm 21 in accordance with the changing temperature of air which has passed through the radiator. This action causes the opening 12 to be opened and closed as shown in FIG. 4, thereby controlling the communication between the working chamber 9 and the fluid reservoir chamber 8, that is, the amount of oil in the fluid coupling. When engine cooling requirements are severe, as during high-temperature, high-speed operation, more oil is injected into the fluid coupling from the reservoir chamber 8 through the opening 12. This action increases the amount of engine torque transmitted to the coupling. Fan speed therefore increases. When engine cooling requirements are low, as during low-temperature, intermediate-speed operation, oil is withdrawn from the fluid coupling through a return fluid path 18, subsequently less power passes through the coupling and fan speed is reduced.

Figure 2:
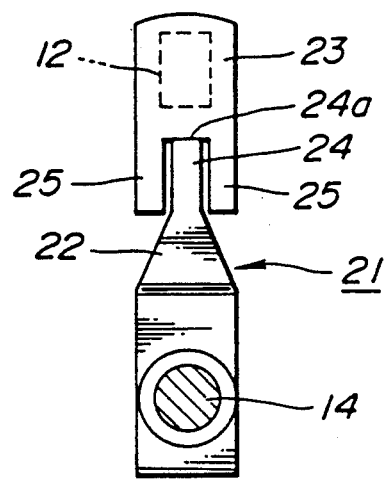
FIG. 2 a front view which shows a valve arm according to the invention.
Figure 3:
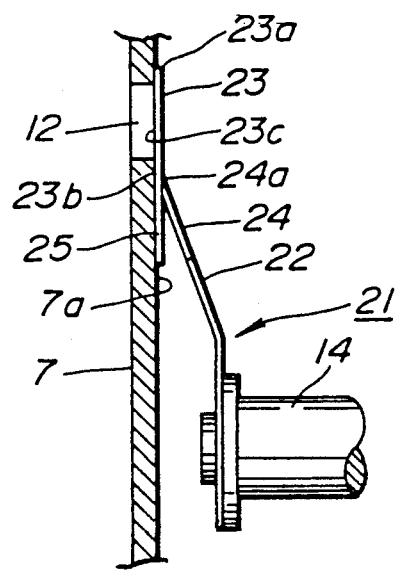
FIG. 3 is a side view which shows a valve arm and a clutch plate according to the invention.

Referring to FIGS. 2 and 3, there is illustrated the valve arm 21 according to the invention. This valve arm 21 is provided with a slant plate 22 bent toward the pump plate side and a valve plate 23 for opening and closing the opening 12. The slant plate 22 further includes a connecting plate 24 of narrower width than the valve plate 23. The valve plate 23 is substantially rectangular in shape and is integrally connected to an end of the slant plate 22 via the connecting plate 24 so as to be arranged parallel to the surface of the pump plate 7. The connecting plate 24 has a width about 2 to 3 (mm) narrower than that of the slant plate 22 so as to be elastically deformable. On both sides of the lower end of the valve plate 23, a pair of extending portions 25 are formed which extend toward the slant plate 22 and are integrally provided on a plane defined by the valve plate 23. The extending portions 25 extend on either side of the connecting plate 24, and the connecting plate is also integrally formed with the valve plate 23 extending between the extending portions 25 at an angle from the plane of the valve plate 23. The width of the connecting plate 24 flares at a predetermined point on the length thereby to form the tapered slate plate 22.

In valve arms of the prior art, if while operating, the shaft 14 moves within a clearance occurring due to a tolerance between the bearing hole 3b and the shaft 14, the valve arm 21 tends to vibrate, slapping back and forth against the pump plate 7. In such case, the valve arm 21 of the present invention through the spring action thereof, forces the connecting portion 24a, which forms the border between the valve plate 23 and the connecting plate 24, against the surface 7a of the pump plate 7. In this instance, when the connecting portion 24a is forced against the surface 7a, the top edge 23a of the valve plate 23 can be caused to lift away from the surface 7a due to leverage caused by pressure against the lower edge 23b. This lifting action is, however, prevented through counter-leverage induced by the extending portions 25 via the elastic properties of the connecting plate 24 to prevent the edge 23a from lifting. In other words, movement, or vibrations of the valve arm 21 are absorbed by the connecting plate 24. The entire surface of the valve plate 23 therefore maintains hermetic contact with the surface 7a. On the other hand, when the vibrations of the valve arm 21 are such that the bordering edge 23b is inclined to be lifted from the surface 7a the connecting plate 24 is deformed elastically. This deformation absorbs the movement of the valve arm 21 to maintain the contact of the valve plate 23 with the surface 7a without any clearance therebetween.

It will be appreciated that the entire surface 23c of the valve plate 23 contacts uniformly and hermetically with the opposing surface 7a regardless of the movement of the valve arm 21. This secure closing of the opening 12 by the valve plate 23 is achieved when the temperature of the air passing through the radiator is low enough that flow of working fluid from the reservoir fluid chamber 8 into the working chamber 9 is unnecessary. Thus, unnecessary rotation of the clutch housing 3 relative to the clutch plate 6 is prevented when engine cooling requirements are low.

As is clear from the above, in the fan drive clutch for an internal combustion engine according to the invention, an elastically transformable narrow-width plate, or connecting plate 24 is provided which is connected to the edge of the valve plate 23. A pair of extending portions 25 are also provided at both sides of the connecting plate 24 so as to extend on the same plane as defined by the valve plate 23. Therefore, by elastic deformation of the connecting plate 24, vibrations of the valve arm 21 are absorbed so as to maintain the valve plate 23 hermetically in contact with the pump plate 7. This hermetic contact enables the valve to seal the opening 12 without any clearance. As a result, overcooling caused by excessive rotation speeds of the clutch housing during starting operations is prevented and thereby subcooling of the radiator is avoided to improve engine performance during warm-up.

Although this invention has been shown and described with respect to detailed embodiments thereof, it will be understood by those skilled in the art that various changes in the form and detail thereof may be made without departing from the spirit and scope of the claimed invention. For example, in the above embodiment, a pair of extending portions for preventing the valve plate from lifting is provided. The connecting plate may be however connected near the center of the valve plate to provide a single extending portion which functions similarly to the pair of extending portions described above. Alternatively, a single strip plate which extending from the middle portion of an edge may be provided to achieve the same effect as the pair of extending portions.

What is claimed is:

1. An apparatus for coupling a first member with a second member connected to a drive source comprising;
    a housing defining said first member engaging the second member therewithin;
    a plate for defining a fluid reservoir chamber and a working chamber in said housing, said plate having an opening for fluid communication therethrough so as to allow a working fluid to flow from the fluid reservoir chamber into the working chamber;
    a valve including a valve arm and a valve plate, said valve arm being supported by the first member via supporting means so that said valve plate slidably contacts with a surface of said plate in a circumferential direction with respect to said supporting means so as to open and close said opening;
    fluid coupling means, provided within said working chamber, for coupling the first member with the second member to transmit torque from the drive source of the second member to the first member in accordance with variations in the amount of working fluid within the working chamber due to the opening and closing of said valve;
    absorbing means for absorbing vibrations transmitted via said valve arm from the supporting means to said valve plate, said absorbing means being an elastic member connecting the valve plate to the valve arm so as to be elastically deformed by the vibrations to maintain the valve plate in contact with a surface of said plate without any clearance therebetween; and
    extending portions extending, with respect to a junction of said valve plate and said absorbing means, from an edge of the valve plate in a direction opposite a portion corresponding to said opening for preventing another edge of the valve plate, opposite said edge, from lifting away from said plate due to the pressing of said valve plate against said plate by said valve arm.

2. An apparatus as set forth in claim 1, wherein said elastic member is in the form of a strip plate having a width narrower than that of the valve arm.

3. A fan drive clutch for an internal combustion engine comprising;
    a clutch housing on which a fan is disposed;
    a pump plate for defining a fluid reservoir chamber and a working chamber within said clutch housing, said pump plate having an opening for communicating between the fluid reservoir chamber and the working chamber;
    a valve including a valve plate and a valve am rotatably supported by a shaft which is inserted into a bearing hole formed in said clutch housing, said valve plate slidably coming in contact with a surface of said pump plate in a circumferential direction with respect to the shaft to open and close said opening;
    fluid coupling means, provided within said working chamber, for coupling between a drive shaft and said clutch housing to rotate the fan in accordance with variations in the amount of working fluid within the working chamber due to the opening and closing of said valve;
    absorbing means for absorbing movement transmitted from said valve arm to said valve plate due to movement of the shaft within a clearance between the shaft and the bearing hole, said absorbing means being an elastic member connecting the valve plate to the valve arm so as to be elastically deformed by vibration of the valve arm to maintain the valve plate in contact with the surface of said pump plate without any clearance therebetween; and
    extending portions extending, with respect to a junction of said valve plate and said absorbing means, from an edge of the valve plate in a direction opposite a portion corresponding to said opening for preventing another edge of the valve plate, opposite said edge, from lifting away from said pump plate due to the pressing of said valve plate against said pump plate by said valve arm.

4. A fan drive clutch as set forth in claim 3, wherein said elastic member is in the form of a strip plate having a width narrower than that of the valve arm.

* * * * *